US012538121B2

(12) United States Patent
Fu et al.

(10) Patent No.: US 12,538,121 B2
(45) Date of Patent: Jan. 27, 2026

(54) SECURE DATA COLLECTION IN FIFTH GENERATION SYSTEM (5GS)

(71) Applicant: Telefonaktiebolaget LM Ericsson (publ), Stockholm (SE)

(72) Inventors: Zhang Fu, Stockholm (SE); Pinar Comak, Ankara (TR); Ulf Mattsson, Kungsbacka (SE); Maria Belen Pancorbo Marcos, Madrid (ES)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 306 days.

(21) Appl. No.: 18/266,295

(22) PCT Filed: Dec. 10, 2021

(86) PCT No.: PCT/IB2021/061580
§ 371 (c)(1),
(2) Date: Jun. 9, 2023

(87) PCT Pub. No.: WO2022/123526
PCT Pub. Date: Jun. 16, 2022

(65) Prior Publication Data
US 2024/0048975 A1 Feb. 8, 2024

Related U.S. Application Data

(60) Provisional application No. 63/124,334, filed on Dec. 11, 2020.

(51) Int. Cl.
*H04L 29/06* (2006.01)
*H04W 12/037* (2021.01)
*H04W 12/041* (2021.01)

(52) U.S. Cl.
CPC ....... *H04W 12/037* (2021.01); *H04W 12/041* (2021.01)

(58) Field of Classification Search
CPC ............. H04W 12/037; H04W 12/041; H04W 12/033; H04W 12/106; H04L 63/0442; H04L 67/51; H04L 67/55
See application file for complete search history.

(56) References Cited

U.S. PATENT DOCUMENTS

2009/0041247 A1\* 2/2009 Barany ............. H04W 12/0433
380/270
2012/0263301 A1\* 10/2012 Lee ...................... H04W 12/041
380/270

(Continued)

FOREIGN PATENT DOCUMENTS

CN 103782568 A \* 5/2014 .............. H04W 8/18

OTHER PUBLICATIONS

Author Unnown, "Technical Specification Group Services and System Aspects; Study on security aspects of enablers for Network Automation (eNA) for the 5G system (5GS) Phase 2; (Release 17)," Technical Report 33.866, Version 0.2.0, Nov. 2020, 3GPP Organizational Partners, 11 pages.

(Continued)

*Primary Examiner* — Shawnchoy Rahman
(74) *Attorney, Agent, or Firm* — Sonoda & Kobayashi Intellectual Property Law; Sarvajit S. Patil

(57) ABSTRACT

Systems and methods for secure data collection in Fifth Generation System (5GS) are provided. In some embodiments, a Data Collection Coordination Function (DCCF) in a data management framework is adapted to receive, from a first data consumer, a subscription request message, determine a data producer for the particular data, obtain one or more keys for data encryption and/or data integrity for the particular data, controlling one or more entities in a messaging framework of the data management framework, sending a subscription response message to the first data consumer, and sending a subscription request message to the (Continued)

data producer. The subscription request message comprises the one or more keys to be used by the data producer when sending notifications of the particular data to the first data consumer via the messaging framework.

12 Claims, 11 Drawing Sheets

(56) References Cited

U.S. PATENT DOCUMENTS

2017/0353983 A1* 12/2017 Grayson .............. H04W 12/06
2018/0359612 A1* 12/2018 Buckley .............. H04L 65/611

OTHER PUBLICATIONS

Author Unknown, "Technical Specification Group Services and System Aspects; Architecture enhancements for 5G System (5GS) to support network data analytics services (Release 16)," Technical Specification 23.288, Version 16.5.0, Sep. 2020, 3GPP Organizational Partners, 66 pages.

Author Unknown, "Technical Specification Group Services and System Aspects; Study on enablers for network automation for the 5G System (5GS); Phase 2 (Release 17)," Technical Specification 23.700-91, Version 1.1.0, Oct. 2020, 3GPP Organizational Partners, 353 pages.

Author Unknown, "Technical Specification Group Services and System Aspects; Study on enablers for network automation for the 5G System (5GS); Phase 2 (Release 17)," Technical Specification 23.700-91, Version 2.0.0, Nov. 2020, 3GPP Organizational Partners, 378 pages.

Ericsson, "S3-211051: Solution on Providing the Security protection of data via Messaging Framework," 3GPP TSG-SA3 Meeting #102Bis-e, Mar. 1-5, 2021, Electronic Meeting, 4 pages.

International Search Report and Written Opinion for International Patent Application No. PCT/IB2021/061580, mailed Feb. 25, 2022, 14 pages.

International Preliminary Report on Patentability for International Patent Application No. PCT/IB2021/061580, mailed Oct. 27, 2022, 26 pages.

* cited by examiner

SECURE DATA COLLECTION IN FIFTH GENERATION SYSTEM (5GS)

RELATED APPLICATIONS

This application is a 35 U.S.C. § 371 national phase filing of International Application No. PCT/IB2021/061580, filed Dec. 10, 2021, which claims the benefit of provisional patent application Ser. No. 63/124,334, filed Dec. 11, 2020, the disclosures of which are hereby incorporated herein by reference in their entireties.

TECHNICAL FIELD

The present application relates to secure data collection in Fifth Generation System (5GS).

BACKGROUND

Third Generation Partnership Project (3GPP) Technical Report (TR) 23.700-091 defines a Data Collection Coordination Function (DCCF) for efficient data collection in the Fifth Generation (5G) System (5GS). The following excerpt from 3GPP TR 23.700-091 describes the architecture and procedure for the DCCF.

***Start Excerpt from 3GPP TR 23.700-091***

6.9 Solution #9: Data Management Framework for 5GC
6.9.1 Introduction
This Solution addresses aspects of KI #1, KI #2 and KI #11 dealing with Data/Information Management and logical NWDAF decomposition.

It proposes a decomposition of the NWDAF so a Data Management Framework for 5GC is separated from Analytics functions (KI #1). The Data Management Framework for 5GC uses the Consumer/Producer model of the 5GS services-based architecture to efficiently exchange data/information of different types. This includes:

Data retrieved from various sources (e.g. OA&M, and NFs such as AMF, SMF, PCF and AF), to be used as a basis for computing analytics as per Rel-16, NWDAF Analytics (KI #11)

Analytics output from an NWDAF Producer sent to an NWDAF Consumer (KI #2) to support a hierarchy of NWDAF instances or sent to multiple network functions.

NOTE: In the above, an NWDAF Producer provides Analytics to a Consumer (e.g. using the Services defined in TS 23.288 [5] clause 7). An NWDAF Consumer is an NWDAF that Consumes the Analytics of another NWDAF (e.g.: using the services of the NWDAF Producer).

6.9.2 Functional Description
6.9.2.1 General
The Data Management Framework for 5GC is shown in FIG. 6.9.2-1. It is backwards compatible with a Rd. 16 NWDAF. Specifically:

a No change is proposed to the Rel-16 Nnwdaf services defined in TS 23.288 [5] clause 7. These are the services offered by an NWDAF to a Consumer of NWDAF analytics b No change is proposed to the Rel-16 NF Services consumed to obtain Data. These are the services offered by NFs (e.g. AMF, SMF, PCF, UDM, etc.), mostly in the form of Event Exposure as described in TS 23.288 [5] Table 6.2.2.1-1. Hence the solution is backwards compatible with Rel-16 NFs that provide Data.

c For Rel-17, the baseline for services offered by the DCCF (e.g. to an NWDAF Analytics Function) are the Rel-16 NF Services used to obtain Data. For example, the baseline for the DCCF service used by an NWDAF consumer to obtain UE mobility data would be Namf_EventExposure.

A Rel-16 NWDAF can coexist with a Rel-17 NWDAF and the Data Management Framework. The Rel-16 NWDAF continues to request Data directly from NFs without using the Data Management Framework and provides analytics to consumers that discover the Rel-16 NWDAF. The Rel-17 NWDAF would request Data from the Data Management Framework, and if the data is not collected already, the Data Management Framework would request the data from a data source. In other words, a Data Source would independently send Data to the Rel-16 NWDAF that sent a request directly to the Data Source, and to the Data Management Framework that sent a request for the Rel-17 NWDAF(s).

The NWDAF is decomposed by moving Data Collection, including the task of identifying the Data Source, to the Data Management Framework. The Rel-17 NWDAF requests data from the Data Management Framework but may not query the NRF/BSF/UDM to determine which NF instance serves a UE, nor need it be concerned about the life-cycles of Data Source NFs, as was the case in Rel-16. This decomposition also allows other NFs to obtain data via the Data Management Framework and avoids duplicate data collection from the same Data Source. The Rel-17 NWDAF (without Data Collection) may be referred to as the "NWDAF Analytics Function."

NOTE: This solution does not preclude additional decomposition of the NWDAF, for example to separate Analytics and ML training functions as has been proposed in other Solutions.

The Framework consists of the following components:
1 Data Collection Coordination Function (DCCF).
2 with optional DCCF Adaptor (DA)
3 Messaging Framework (for Data Forwarding and Replication),
4. with optional Adaptors (3CA and 3PA) to isolate the Messaging Framework protocol from the Data Source and the Data Consumer.

The interfaces subject to 3GPP standardization are NF consumer-DCCF, DCCF-NF producer, DCCF-DA, NF consumer 3CA and NF producer-3PA. It is expected that 3PA can re-use existing interfaces and services.

FIG. 6.9.2.1-1: Data Management Framework for 5GC [REPRODUCED HEREIN AS FIG. 11]

NOTE 1: When Data Source is OA&M, OA&M services, as defined by SA WG5, are reused.

NOTE 2: The 3PA may alternatively be standalone or combined with the Data Source. A 3PA is not needed if the Data Source natively supports the message bus protocol.

NOTE 3: The 3CA may alternatively be standalone or combined with the Data Consumer. A 3CA is not needed if the Data Consumer natively supports the message bus protocol.

NOTE 4: The DA may alternatively be standalone or combined with the DCCF. A DA is not needed if the DCCF natively supports the message bus protocol.

NOTE 5: The intended Consumer of Data Management Framework services is an NWDAF Analytics Function or an NF requesting analytics, but as with other NF services, nothing precludes other Consumers (NFs) from using it.

NOTE 6: NWDAFs co-located with NFs can also be consumers of Data Management Framework services, thus avoiding duplicate data collection from the NFs, e.g. by co-located NWDAF and other NWDAFs.

NOTE 7: Adaptors (3CA, 3PA and DA) are not expected to be standardized by 3GPP, only the interface between 3GPP entities and the adaptors is under 3GPP scope.

6.9.2.2 Data Collection Coordination Function (DCCF)

The DCCF is a control-plane function that coordinates data collection and triggers data delivery to Data Consumers. A DCCF may support multiple Data Sources, Data Consumers, and Message Frameworks. However, to prevent duplicate data collection, each Data Source is associated with only one DCCF.

The DCCF provides the 3GPP defined Ndccf_DataExposure Service to Data Consumers (e.g.: NWDAF), and uses the services of Data Sources (e.g.: 3GPP NF) to obtain data. FIG. 6.9.2.1-1 shows one DCCF for the 5GC. There can be multiple instances of the DCCF, e.g. for network slices, geographic regions where Data Sources reside or for different Data Source types. A DCCF needed by a Consumer can be discovered using the NRF as described below.

NOTE 1: the DCCF is aware of the Data Sources it is coordinating. The NRF and UDM can provide the DCCF with the identity of 5GC Data Sources (e.g.: an AMF serving a UE). The DCCF also hides Data Source life cycle events and changes of entity serving a UE from the Data Consumer. For example, if an NF Data Source that serves a UE changes because of a life-cycle event, the NRF may notify a DCCF that has previously subscribed to NRF event notifications. The DCCF may also use the UDM to learn the new (UE, NF) association, thus making the change of the NF serving an UE transparent to the Data Consumer.

NOTE 2: In this release, if there is more than one DCCF, they should coordinate the collection and distribution of data for orthogonal sets of Data Sources. In this case a Data Consumer discovers the DCCF for the data it needs, and the DCCF and the Message Framework delivers the data from the proscribed set of Data Sources. If a DCCF cannot serve a request from a Data Consumer it may query the NRF to determine an acceptable DCCF and redirect the query accordingly.

NOTE 3: DCCF is not intended to support aggregation of analytics data across multiple NWDAFs. However, the DCCF keeps track of Consumer Requests to the NWDAF "Data Source", and hence knows what analytics are being produced by an NWDAF. Therefore, the Data Management Framework can be used by a Consumer (which could be an NWDAF) that consumes (e.g. aggregates) analytics data from one or more NWDAF acting as a "Data Source" or from the Data Repository. The NWDAF acting as "Data Source" supplies Analytics output as "Data", using the services defined in TS 23.288 [5] clause 7 (subscribe/notify), similar to any other NF.

The DCCF:

Receives data requests from Data Consumers via the Ndccf_DataExposure service. A Data Consumer may be a NWDAF Analytics function (Rel-17 NWDAF) and the contents of the service requests are based on Rel-16 services (e.g. AMF or SMF event exposure). The DCCF service may provide additional functionality, for example to allow one request that requires multiple Data Sources (e.g. AMF and SMF), and allow formatting and processing of notifications according to conditions specified by the consumer as described in the bullet list below.

If the Data Source is not specified in the Data Request, the DCCF determines the Data Source that can provide the data requested by the Data Consumer (e.g. an event requested by the Data Consumer for NF event exposure). For example, if the request is for UE specific data, the DCCF may query the NRF/UDM/BSF to determine which NF instance is serving the UE, as described in TS 23.288 [5] Table 6.2.2.1-2: NF Services consumed by NWDAF to determine which NF instances are serving a UE.

If the Data Source is specified in the Data Request (e.g. the data consumer is configured with the data sources), the DCCF checks whether the Data is already collected from the Data Source. If not, it will request the Data to the specified Data Source.

The DCCF checks if the Data Consumer is authorized to access DCCF services using the procedures specified in TS 23.501 [2] clause 7.1.4 "Network Function Service Authorization".

NOTE 1: Additional authorization for Consumers to access data from a Data Source via the DCCF may be considered by SA WG3.

Determine if the requested data is currently being produced by any Data Source and sent to the Messaging Framework. If the requested data is not being produced, a new subscription/request is sent towards the Data Source to trigger a new data collection and the DCCF then subscribe with the messaging framework for the Consumer to receive future notifications. Similarly, when the last Data Consumer of a specific data does no longer wants data, the DCCF cancels data collection from the Data Source and from the messaging framework. This ensures that the Data Source is only producing the same data once when there are multiple Data Consumers and is not producing data that no Data Consumer needs.

The DCCF determines if data is already being collected by maintaining a record of the prior requests it has made for data (e.g.: via an Nnf_EventExposure service offered by the Data Source). If parameters in a prior request for data match those that are needed in a subsequent request, the DCCF may determine that the requested data is already being collected. The DCCF may then subscribe with the messaging framework for the new Consumer to receive future notifications.

Formatting conditions and Processing instructions requested by Data Consumers via the Ndccf_DataExposure service may be passed to the Messaging Framework via the Nda_Data_Management Service. The 3CA may then accordingly send notifications to the consumer. Formatting conditions determine when a notification is sent to the Consumer. For example formatting may include:

Notification Event clubbing (buffering and sending of several notifications in one message).

A Notification Time Window (e.g.: notifications are buffered and sent between 2 and 3 AM).

Cross event reference-based notification (when a subscribing NF is subscribing to multiple events (e.g.: event X and event Y) the notification for an Event-X is buffered and reported only when the Event-Y occurs).

Consumer triggered Notification.

Exact time-based Notification without the event (Data is reported at an exact time, irrespective of event occurs or not. Example: every 30 min).

Mathematical calculation based notification (e.g.: Exponential time window: The first notification is sent after 5 min. The next notification is sent after 10 min, and the third is after 15 min etc.).

NOTE 2: The extent of formatting variations to be supported can be decided in the normative phase.

Processing instructions allow summarizing of notifications at 3CA to reduce the volume of data reported from the 3CA to the Data Consumer. This is particularly useful when data from a Data Repository (historical data) is requested that comprises a large number of notifications. The type of processing is specified by the consumer and may result in joining the information from multiple notifications into a common report.

When the DCCF receives a request for historical data (e.g. an NWDAF requesting analytics previously generated by another NWDAF), the DCCF may trigger retrieval of the data from the Data Repository and make it available over the messaging framework.

Manages subscription requests and cancellations to the Messaging Framework on behalf of Data Consumers. The DCCF may use a native Messaging Framework protocol or alternatively a 3GPP defined protocol with an adaptor that translates to the Messaging Framework protocol (as depicted in the FIG. 6.9.2-1).

If standalone 3PAs and 3CAs are used, the DCCF maintains the (NF, 3PA) and (NF, 3CA) associations.

For DCCF discovery, the DCCF registers with the NRF and is discovered by Consumers or the SCP using the registration and discovery procedures defined for the Network Function Service Framework in TS 23.502 [3], clause 4.17. The DCCF profile in the NRF may specify:

1—The slices (S-NSSAIs) that the DCCF Supports.
2—The Source Types that a DCCF coordinates.
3—The serving area (e.g. list of TAIs) containing Data Sources that the DCCF coordinates.

Source Type may correspond to an NF Type (e.g.: SMF, AMF, etc.), or different domains (e.g.: OA&M). Hence a Consumer or SCP may request or select a DCCF according to the type of information it is requesting, the network slices it supports and its serving area.

NOTE 3: Additional DCCF Profile parameters can be considered during the normative stage.

6.9.2.3 Messaging Framework

The Messaging Framework is not expected to be standardized by 3GPP. It contains Messaging Infrastructure that propagates event information and data (e.g.: streaming and notifications) from Data Sources to Data Consumers. The Messaging Framework may support the pub-sub pattern, where data is published by producer adaptors (or data source if the data source natively supports the message bus protocol) and can be subscribed to by consumer adaptor (or data consumers if the data consumer natively supports the message bus protocol).

The Messaging Framework may support multiple event delivery mechanisms such as best effort or guaranteed delivery. For 3GPP purposes guaranteed delivery of events may be utilized.

The Messaging Framework may contain one or more Adaptors that translate between 3GPP defined protocols (e.g.: Rel-16 Nnwdaf_AnalyticsSubscription_Notify) and a Data Forwarding Protocol not specified by 3GPP. The Messaging Framework adaptors maintain subscription information, including formatting conditions and processing instructions received by the DA.

The Adaptor on the Producer side (3PA) allows any Source Data (e.g. from Rel-16 OA&M or NF EventExposure) to be distributed via the framework without impact on the Data Source. The DCCF keeps track on the Adaptor instances. An Adaptor may be associated with specific NF types, manage one or more data Sources, and may be provisioned on the DCCF together with the sources it support. If the Messaging Framework directly supports 3GPP interfaces, Adaptors may not be required.

<Text Omitted>

6.9.3 Procedures for Consumers and Producers Using 3CA and 3PA

An example procedure is given in FIGS. 6.9.3-1 for Data Collection & Distribution for Event Notifications (Subscribe/Notify). The procedure illustrates how the DCCF manages Data Sources so data are produced only once and how the DCCF interacts with the messaging framework so data are distributed to all subscribed Data Consumers. The procedure applies for consumers and producers using 3CA and 3PA, i.e. all steps are within 3GPP remit.

Data handled by the messaging framework is associated with an identifier. The example procedure in FIG. 6.9.3-1 assumes that the Messaging Framework uses a Pub/Sub model based on "Data Tags" (which could for example be a "Topic" in some message framework protocols). The 3PA can publishes to a "Data Tag" and a 3CA that wishes to receive the data subscribes to the "Data Tag". Other options can also be supported.

FIG. 6.9.3-1: Data Collection & Distribution for Event Notifications (Subscribe/Notify) [REPRODUCED HEREIN AS FIG. 12]

1. Data Consumer-1 (e.g.: NWDAF-1) sends a request for data to the DCCF. The message includes the Notification Target Address. The message may indicate whether the requested data should be sent to the Notification Target Address set to Data Consumer-1 and/or to other Consumers such as Data Repository. The Notification Correlation ID of the Consumer-1 is included in the request message and is used for notifications sent to Data Consumer-1 (e.g. in step 8).
2. If the request is for UE data, the DCCF may query the UDM/NRF/BSF to determine the NF serving the UE.
3. The DCCF determines the Data Source (e.g. AMF-1) that can provide the data and checks that the requested data is not already being collected.
4. The DCCF controls the message bus and the adaptors so the notifications traverse the messaging framework. The subscription to the DA includes a Notification Correlation ID of the 3PA and the Notification Correlation ID for Data Consumer-1 as received in step 1. The DA may associate these with a messaging framework. The 3PA is provided with its Notification Correlation ID and the "Data Tag". The 3CA will be provided with the consumer's notification endpoint, the Notification_Correlation_ID of the Consumer and the "Data Tag". The 3CA may then subscribe to the "Data Tag" in the messaging framework.
5. The DCCF sends a subscription request to a NF producer acting as a data source. The subscription includes the notification endpoint and Notification Correlation ID of the 3PA that is acting as the receiver for these notifications.

6. The Data Source acknowledges the request
7. A Notification containing the Notification Correlation ID of the 3PA is sent to the 3PA after an event trigger at the Data Source. The 3PA publishes the data in the message framework. It may use "Data Tag" the associated with the Notification Correlation ID of the 3PA received in step 4.
8. When the data is published to the "Data Tag", the Messaging Framework makes it available to all subscribed 3CA. In this case the only subscriber is a 3CA serving consumer-1. This 3CA maps the "Data Tag" to the Notification Correlation ID of the Data Consumer received in Step 4 (which was originally provided by Data Consumer-1) and sends the notification to the notification endpoint of Data Consumer-1.
9. Data Consumer-2 (e.g.: NWDAF-2) sends a request for the same Data. The message may indicate whether the requested data should be sent to Data Consumer-2, and/or to other Consumers such as Data Repository. The Notification Correlation ID of Consumer-2 is included for notifications sent to Data Consumer-2.
10. The DCCF determines that the requested data is already being collected from a Data Source (e.g.: AMF-1) and retrieves 3PA ID and the Notification Correlation ID of the 3PA.
11. The DCCF sends a subscription request to the Messaging Framework indicating that there is a new subscriber of the data. The subscribe message to the DA provides the 3PA ID, the 3PA Notification Correlation ID currently in use, and the Notification Correlation ID for Data Consumer-2 as received in step 9. The DA selects the existing "Data Tag" corresponding to the 3PA information and sends the 3CA Consumer-2's notification endpoint, the Notification_Correlation_ID of Consumer-2 and the "Data Tag". The 3CA may then subscribe to the "Data Tag" in the messaging framework.
NOTE: The 3CA for Consumer-2 may be different or the same from 3CA for Consumer-1.
12. After an event is triggered in the data source, a Notification is sent to the 3PA and 3PA publishes the data to the corresponding "Data Tag" on the Messaging Framework.
13-14. When the data is published to the "Data Tag" the Messaging Framework makes it available to the subscribed 3CAs. In this case the 3CAs serving consumer-1 and consumer-2 receive the data and send the notifications to the notification endpoints of Data Consumer-1 and Data Consumer-2 using the Notification Correlation ID of Consumer-1 and Consumer-2, respectively. A Data Repository also receives notifications if it has subscribed via the DCCF.

***End Excerpt from 3GPP TS 23.700-091***

SUMMARY

Embodiments for secure data collection for Fifth Generation System (5GS) are disclosed in the present disclosure. In one embodiment, a method performed in a data management framework for a core network of a cellular communications system, comprises, at a Data Collection Coordination Function (DCCF) of the data management framework, receiving, from a first data consumer in the core network, a subscription request message that requests a subscription to particular data, determining a data producer for the particular data in the core network, obtaining one or more keys for data encryption and/or integrity protection for the particular data, controlling one or more entities in a messaging framework of the data management framework such that notifications of the particular data received from the data producer traverse the messaging framework to a target indicated in the subscription request message; sending a subscription response message to the first data consumer, the subscription response message comprising the one or more keys; sending a subscription request message to the data producer, the subscription request message comprising the one or more keys. At the first data consumer, the method comprises sending a subscription request message to the DCCF, receiving the subscription response message from the DCCF, receiving, from the data producer via the messaging framework, a notification message comprising the particular data. The particular data comprised in the notification message is encrypted and/or integrity protected based on the one or more keys. The method further performing decryption and/or integrity protection check on the data comprised in the notification message based on the one or more keys received in the subscription response message. At the data producer, the method further comprises receiving the subscription request message from the DCCF, sending the notification message comprising the particular data to the first data consumer via the messaging framework. The particular data comprised in the notification message is encrypted and/or integrity protected based on the one or more keys. In this way, the confidentiality and integrity of the data are guaranteed when the data is forwarded by the Messaging Framework.

In one embodiment, a method performed by a DCCF in a data management framework for a core network of a cellular communications system comprises receiving from a first data consumer in the core network, a subscription request message that requests a subscription to particular data, determining a data producer for the particular data in the core network, obtaining one or more keys for data encryption and/or data integrity for the particular data, controlling one or more entities in a messaging framework of the data management framework such that notifications of the particular data received from the data producer traverse the messaging framework to a target indicated in the subscription request message, sending a subscription response message to the first data consumer, the subscription response message comprising the one or more keys, and sending a subscription request message to the data producer, the subscription request message comprising the one or more keys to be used by the data producer when sending notifications of the particular data to the first data consumer via the messaging framework.

In one embodiment, the one or more keys comprise a data encryption key.

In one embodiment, the one or more keys comprise a data integrity key.

In one embodiment, the one or more keys comprise a single key for both data encryption and integrity.

In one embodiment, the subscription request message received from the first data consumer comprises information that indicates the target for the notifications of the particular data.

In one embodiment, the information that indicates the target for the notifications of the particular data comprises a notification target address of the first data consumer.

In one embodiment, the subscription request message received from the first data consumer comprises a notification correlation ID of the first data consumer.

In one embodiment, the particular data is UE data, and the method further comprises querying another network node to determine the data producer that is serving an associated User Equipment (UE).

In one embodiment, controlling the one or more entities in the messaging framework of the data management framework such that notifications of the particular data received from the data producer traverse the messaging framework to the target indicated in the subscription request message received from the first data consumer comprises sending a subscribe message to the messaging framework. The subscribe message comprises a notification correlation ID of a 3PA, a notification correlation ID for the first data consumer received in the subscription request message received from the first data consumer.

In one embodiment, the subscription request message sent to the data producer comprises information that indicates a 3PA of the messaging framework that is acting as a receiver for notifications of the particular data for the first data consumer.

In one embodiment, the method further comprises receiving a second subscription request message from a second data consumer for the particular data, determining that the particular data is already being collected from the data producer. The method further comprises, responsive to determining that the particular data is already being collected from the data producer, sending a second subscription response message to the second data consumer. The second subscription response message comprises the one or more keys (i.e., the same keys as those included in the first subscription response to the first data consumer).

In one embodiment, the method further comprises sending a subscription request to a message bus of the messaging framework that indicates that there is a new subscriber to the particular data.

In one embodiment, the subscription request message that indicates that there is a new subscriber to the particular data comprises information that enables the messaging framework send notifications of the particular data to a target indicated in the second subscription request message.

In one embodiment, the information that enables the messaging framework to send notifications of the particular data to the target indicated in the second subscription request message comprises information that causes the data producer to send the data to the same 3PA of the messaging framework.

In one embodiment, the method further comprises obtaining one or more keys for data encryption and/or data integrity for the particular data comprises receiving the one or more keys in the subscription request from the first data consumer.

In one embodiment, the method further comprises obtaining one or more keys for data encryption and/or data integrity for the particular data comprises obtaining the one or more keys from another network function.

In one embodiment, the method further comprises obtaining one or more keys for data encryption and/or data integrity for the particular data comprises generating the one or more keys.

In one embodiment, the first data consumer is a Network Data Analytics Function (NWDAF), a network function, an Application Function (AF), or a Network Exposure Function (NEF).

In one embodiment, the data producer is a NWDAF, a network function, an Application Function (AF), a Network Exposure Function (NEF), or an Operations and Management entity.

In one embodiment, a method performed by a first data consumer, comprises sending the subscription request message to the DCCF, receiving the subscription response message from the DCCF, receiving, from the data producer via the messaging framework, a notification message comprising the particular data. The particular data comprised in the notification message is encrypted and/or integrity protected based on the one or more keys. The method further comprises performing decryption and/or integrity protection check on the data comprised in the notification message based on the one or more keys received in the subscription response message.

In one embodiment, a method performed by a data producer, comprises receiving the subscription request message from the DCCF, and sending notification message comprising the particular data to the first data consumer via the messaging framework. The particular data comprised in the notification message is encrypted and/or integrity protected based on the one or more keys.

Corresponding embodiments of the DCCF, the first data consumer, and the data producer are also disclosed.

In one embodiment, a DCCF is adapted to receive, from a first data consumer in the core network, a subscription request message that requests a subscription to particular data, determine a data producer for the particular data in the core network, obtain one or more keys for data encryption and/or integrity protection for the particular data, controlling one or more entities in a messaging framework of the data management framework such that notifications of the particular data received from the data producer traverse the messaging framework to a target indicated in the subscription request message, send a subscription response message to the first data consumer, the subscription response message comprising the one or more keys, and send a subscription request message to the data producer, the subscription request message comprising the one or more keys.

In one embodiment, a DCCF comprises processing circuitry configured to cause the DCCF to receive, from a first data consumer in the core network, a subscription request message that requests a subscription to particular data, determine a data producer for the particular data in the core network, obtain one or more keys for data encryption and/or integrity protection for the particular data, controlling one or more entities in a messaging framework of the data management framework such that notifications of the particular data received from the data producer traverse the messaging framework to a target indicated in the subscription request message, send a subscription response message to the first data consumer, the subscription response message comprising the one or more keys, and send a subscription request message to the data producer, the subscription request message comprising the one or more keys.

In one embodiment, a first data consumer is adapted to send a subscription request message to the DCCF, receive a subscription response message from the DCCF, receive, from the data producer via the messaging framework, a notification message comprising the particular data, wherein the particular data comprised in the notification message is encrypted and/or integrity protected based on the one or more keys, and perform decryption and/or integrity protection check on the data comprised in the notification message based on the one or more keys received in the subscription response message.

In one embodiment, a first data consumer comprises processing circuitry configured to cause the first data consumer to send a subscription request message to the DCCF, receive a subscription response message from the DCCF, receive, from the data producer via the messaging framework, a notification message comprising the particular data, wherein the particular data comprised in the notification message is encrypted and/or integrity protected based on the one or more keys, and perform decryption and/or integrity protection check on the data comprised in the notification message based on the one or more keys received in the subscription response message.

In one embodiment, a data producer is adapted to receive a subscription request message from the DCCF and send a notification message comprising the particular data to the first data consumer via the messaging framework. The particular data comprised in the notification message is encrypted and/or integrity protected based on the one or more keys.

In one embodiment, a data producer comprising processing circuitry configured to cause the data producer to receive a subscription request message from the DCCF and send a notification message comprising the particular data to the first data consumer via the messaging framework. The particular data comprised in the notification message is encrypted and/or integrity protected based on the one or more keys.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1:
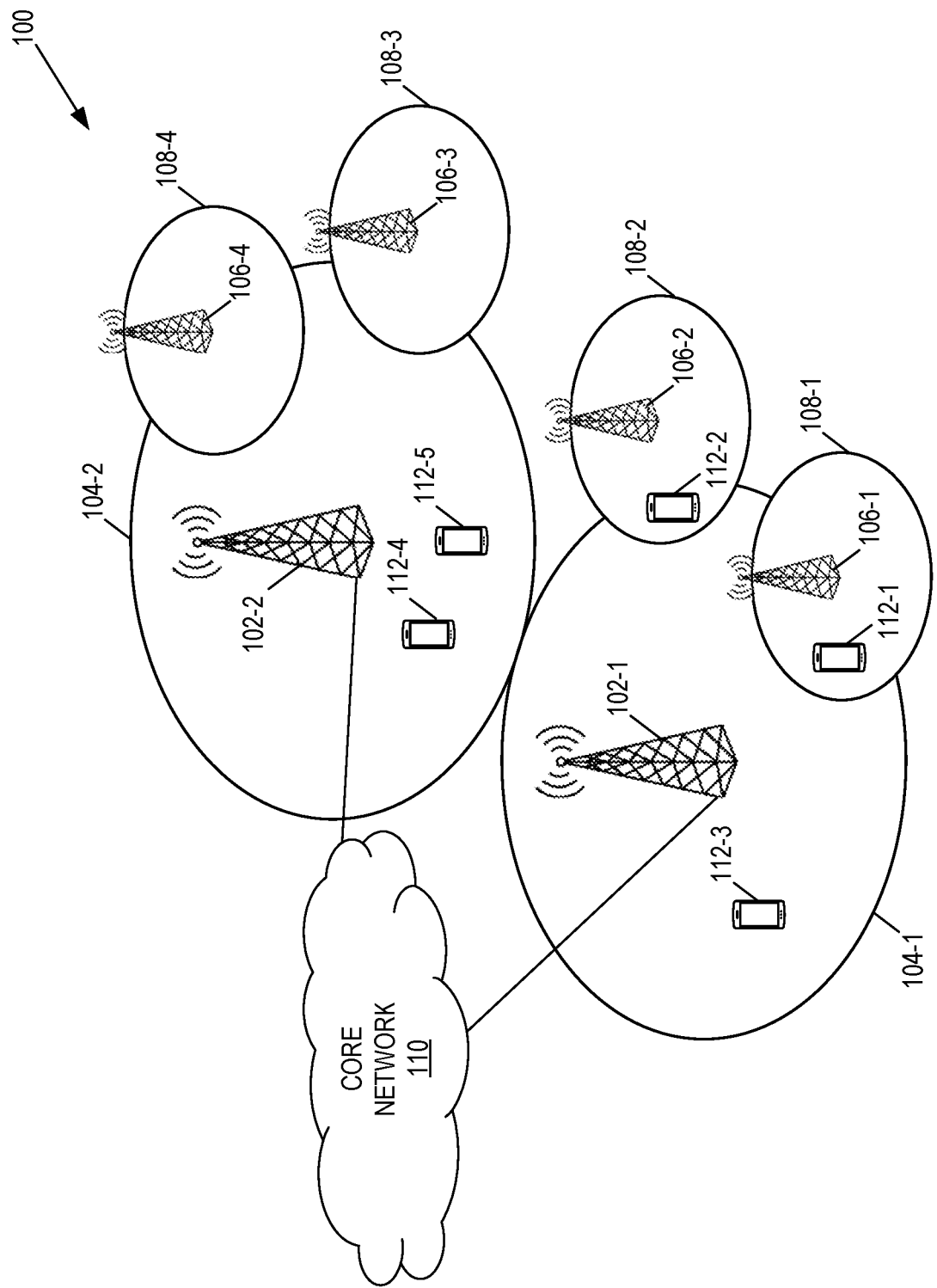
FIG. 1 illustrates one example of a cellular communications system in which embodiments of the present disclosure may be implemented.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" is either a radio access node or a wireless communication device.

Radio Access Node: As used herein, a "radio access node" or "radio network node" or "radio access network node" is any node in a Radio Access Network (RAN) of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), a relay node, a network node that implements part of the functionality of a base station (e.g., a network node that implements a gNB Central Unit (gNB-CU) or a network node that implements a gNB Distributed Unit (gNB-DU)) or a network node that implements part of the functionality of some other type of radio access node.

Core Network Node: As used herein, a "core network node" is any type of node in a core network or any node that implements a core network function. Some examples of a core network node include, e.g., a Mobility Management Entity (MME), a Packet Data Network Gateway (P-GW), a Service Capability Exposure Function (SCEF), a Home Subscriber Server (HSS), or the like. Some other examples of a core network node include a node implementing an Access and Mobility Management Function (AMF), a User Plane Function (UPF), a Session Management Function (SMF), an Authentication Server Function (AUSF), a Network Slice Selection Function (NSSF), a Network Exposure Function (NEF), a Network Function (NF) Repository Function (NRF), a Policy Control Function (PCF), a Unified Data Management (UDM), or the like.

Communication Device: As used herein, a "communication device" is any type of device that has access to an access network. Some examples of a communication device include, but are not limited to: mobile phone, smart phone, sensor device, meter, vehicle, household appliance, medical appliance, media player, camera, or any type of consumer electronic, for instance, but not limited to, a television, radio, lighting arrangement, tablet computer, laptop, or Personal Computer (PC). The communication device may be a portable, hand-held, computer-comprised, or vehicle-mounted mobile device, enabled to communicate voice and/or data via a wireless or wireline connection.

Wireless Communication Device: One type of communication device is a wireless communication device, which may be any type of wireless device that has access to (i.e., is served by) a wireless network (e.g., a cellular network). Some examples of a wireless communication device include, but are not limited to: a User Equipment device (UE) in a 3GPP network, a Machine Type Communication (MTC) device, and an Internet of Things (IoT) device. Such wireless communication devices may be, or may be integrated into, a mobile phone, smart phone, sensor device, meter, vehicle, household appliance, medical appliance, media player, camera, or any type of consumer electronic, for instance, but not limited to, a television, radio, lighting arrangement, tablet computer, laptop, or PC. The wireless communication device may be a portable, hand-held, computer-comprised, or vehicle-mounted mobile device, enabled to communicate voice and/or data via a wireless connection.

Network Node: As used herein, a "network node" is any node that is either part of the RAN or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

There currently exist certain challenge(s). The Data Collection Coordination Function (DCCF) and the Messaging Framework decouple the data collection between the data consumer and the data producer; however, this induces a security problem because the data consumer cannot verify that the data from the data producer is not modified by the Messaging Framework and the confidentiality of the data cannot be guaranteed by the Messaging Framework.

Certain aspects of the present disclosure and their embodiments may provide solutions to the aforementioned or other challenges. Systems and methods for enabling the DCCF to manage encryption and integrity key(s) for data collection are disclosed herein. For the same type of data collection, the DCCF manages an encryption key and an integrity key. While these keys are primarily described herein as separate keys, it should be understood that they may be the same key. The DCCF provides the keys to the data consumer and the data producer. The data producer uses the keys to encrypt the data and generate a Message Integrity Code (MIC), while the data consumer uses the keys to decrypt the data and check the MIC. In such way, the data will not be revealed to the Messaging Framework, and any modification of the data can be detected.

Certain embodiments may provide one or more of the following technical advantage(s). The proposed solution can guarantee the confidentiality and integrity of the data when it is forwarded by the Messaging Framework.

FIG. 1 illustrates one example of a cellular communications system 100 in which embodiments of the present disclosure may be implemented. In the embodiments described herein, the cellular communications system 100 is a 5G system (5GS) including a Next Generation RAN (NG-RAN) and a 5G Core (5GC); however, the embodiments disclosed herein are not limited to a 5GS. In this example, the RAN includes base stations 102-1 and 102-2, which in the 5GS include NR base stations (gNBs) and optionally next generation eNBs (ng-eNBs) (e.g., LTE RAN nodes connected to the 5GC), controlling corresponding (macro) cells 104-1 and 104-2. The base stations 102-1 and 102-2 are generally referred to herein collectively as base stations 102 and individually as base station 102. Likewise, the (macro) cells 104-1 and 104-2 are generally referred to herein collectively as (macro) cells 104 and individually as (macro) cell 104. The RAN may also include a number of low power nodes 106-1 through 106-4 controlling corresponding small cells 108-1 through 108-4. The low power nodes 106-1 through 106-4 can be small base stations (such as pico or femto base stations) or Remote Radio Heads (RRHs), or the like. Notably, while not illustrated, one or more of the small cells 108-1 through 108-4 may alternatively be provided by the base stations 102. The low power nodes 106-1 through 106-4 are generally referred to herein collectively as low power nodes 106 and individually as low power node 106. Likewise, the small cells 108-1 through 108-4 are generally referred to herein collectively as small cells 108 and individually as small cell 108. The cellular communications system 100 also includes a core network 110, which in the 5GS is referred to as the 5GC. The base stations 102 (and optionally the low power nodes 106) are connected to the core network 110.

The base stations 102 and the low power nodes 106 provide service to wireless communication devices 112-1 through 112-5 in the corresponding cells 104 and 108. The wireless communication devices 112-1 through 112-5 are generally referred to herein collectively as wireless communication devices 112 and individually as wireless communication device 112. In the following description, the wireless communication devices 112 are oftentimes UEs, but the present disclosure is not limited thereto.

Figure 2:
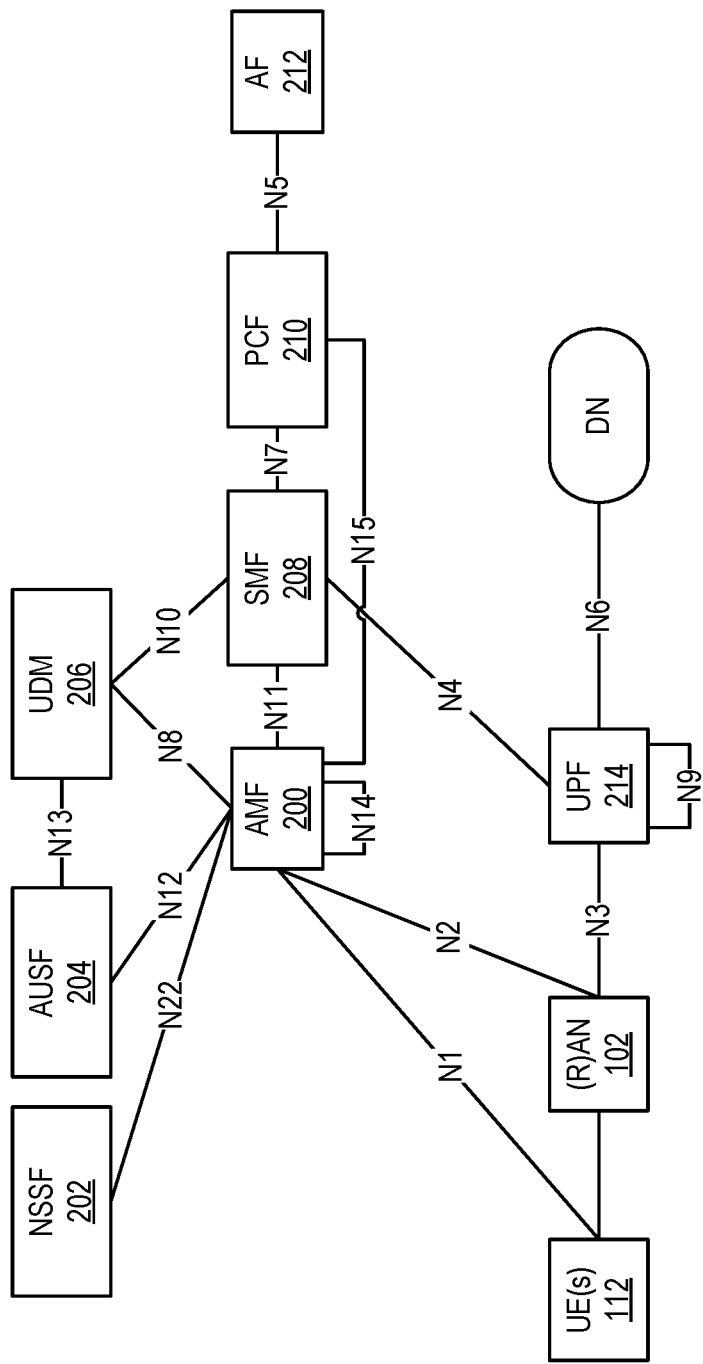
FIG. 2 illustrates a wireless communication system represented as a Fifth Generation (5G) network architecture composed of core Network Functions (NFs).

FIG. 2 illustrates a wireless communication system represented as a 5G network architecture composed of core Network Functions (NFs), where interaction between any two NFs is represented by a point-to-point reference point/interface. FIG. 2 can be viewed as one particular implementation of the system 100 of FIG. 1.

Seen from the access side the 5G network architecture shown in FIG. 2 comprises a plurality of UEs 112 connected to either a RAN 102 or an Access Network (AN) as well as an AMF 200. Typically, the R(AN) 102 comprises base stations, e.g. such as eNBs or gNBs or similar. Seen from the core network side, the 5GC NFs shown in FIG. 2 include a NSSF 202, an AUSF 204, a UDM 206, the AMF 200, a SMF 208, a PCF 210, and an Application Function (AF) 212.

Reference point representations of the 5G network architecture are used to develop detailed call flows in the normative standardization. The N1 reference point is defined to carry signaling between the UE 112 and AMF 200. The reference points for connecting between the AN 102 and AMF 200 and between the AN 102 and UPF 214 are defined as N2 and N3, respectively. There is a reference point, N11, between the AMF 200 and SMF 208, which implies that the SMF 208 is at least partly controlled by the AMF 200. N4 is used by the SMF 208 and UPF 214 so that the UPF 214 can be set using the control signal generated by the SMF 208, and the UPF 214 can report its state to the SMF 208. N9 is the reference point for the connection between different UPFs 214, and N14 is the reference point connecting between different AMFs 200, respectively. N15 and N7 are defined since the PCF 210 applies policy to the AMF 200 and SMF 208, respectively. N12 is required for the AMF 200 to perform authentication of the UE 112. N8 and N10 are defined because the subscription data of the UE 112 is required for the AMF 200 and SMF 208.

The 5GC network aims at separating User Plane (UP) and Control Plane (CP). The UP carries user traffic while the CP carries signaling in the network. In FIG. 2, the UPF 214 is in the UP and all other NFs, i.e., the AMF 200, SMF 208, PCF 210, AF 212, NSSF 202, AUSF 204, and UDM 206, are in the CP. Separating the UP and CP guarantees each plane resource to be scaled independently. It also allows UPFs to be deployed separately from CP functions in a distributed fashion. In this architecture, UPFs may be deployed very close to UEs to shorten the Round Trip Time (RTT) between UEs and data network for some applications requiring low latency.

The core 5G network architecture is composed of modularized functions. For example, the AMF 200 and SMF 208 are independent functions in the CP. Separated AMF 200 and SMF 208 allow independent evolution and scaling. Other CP functions like the PCF 210 and AUSF 204 can be separated as shown in FIG. 2. Modularized function design enables the 5GC network to support various services flexibly.

Each NF interacts with another NF directly. It is possible to use intermediate functions to route messages from one NF to another NF. In the CP, a set of interactions between two NFs is defined as service so that its reuse is possible. This service enables support for modularity. The UP supports interactions such as forwarding operations between different UPFs.

Figure 3:
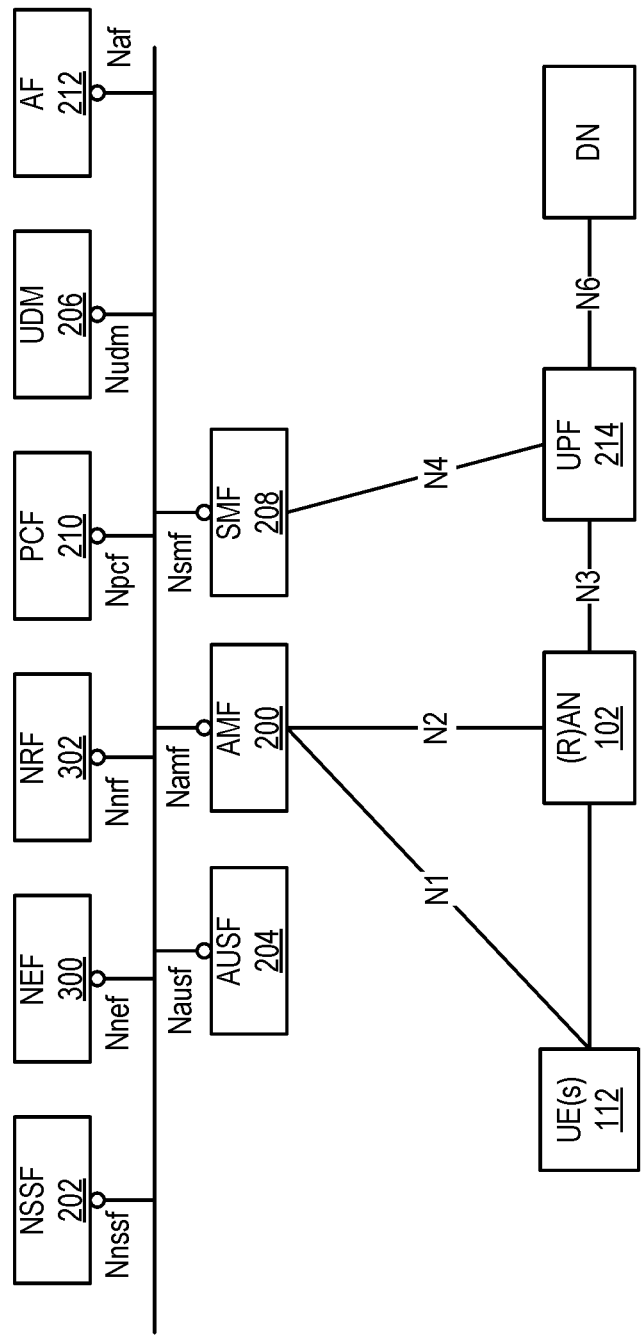
FIG. 3 illustrates a 5G network architecture using service-based interfaces between the NFs.

FIG. 3 illustrates a 5G network architecture using service-based interfaces between the NFs in the CP, instead of the point-to-point reference points/interfaces used in the 5G network architecture of FIG. 2. However, the NFs described above with reference to FIG. 2 correspond to the NFs shown in FIG. 3. The service(s) etc. that a NF provides to other authorized NFs can be exposed to the authorized NFs through the service-based interface. In FIG. 3 the service based interfaces are indicated by the letter "N" followed by the name of the NF, e.g. Namf for the service based interface of the AMF 200 and Nsmf for the service based interface of the SMF 208, etc. The NEF 300 and the NRF 302 in FIG. 3 are not shown in FIG. 2 discussed above. However, it should be clarified that all NFs depicted in FIG. 2 can interact with the NEF 300 and the NRF 302 of FIG. 3 as necessary, though not explicitly indicated in FIG. 2.

Some properties of the NFs shown in FIGS. 2 and 3 may be described in the following manner. The AMF 200 provides UE-based authentication, authorization, mobility management, etc. A UE 112 even using multiple access technologies is basically connected to a single AMF 200 because the AMF 200 is independent of the access technologies. The SMF 208 is responsible for session management and allocates Internet Protocol (IP) addresses to UEs. It also selects and controls the UPF 214 for data transfer. If a UE 112 has multiple sessions, different SMFs 208 may be allocated to each session to manage them individually and possibly provide different functionalities per session. The AF 212 provides information on the packet flow to the PCF 210 responsible for policy control in order to support Quality of Service (QoS). Based on the information, the PCF 210 determines policies about mobility and session management to make the AMF 200 and SMF 208 operate properly. The AUSF 204 supports authentication function for UEs or similar and thus stores data for authentication of UEs or similar while the UDM 206 stores subscription data of the UE 112. The Data Network (DN), not part of the 5GC network, provides Internet access or operator services and similar.

An NF may be implemented either as a network element on a dedicated hardware, as a software instance running on a dedicated hardware, or as a virtualized function instantiated on an appropriate platform, e.g., a cloud infrastructure.

Figure 4A:
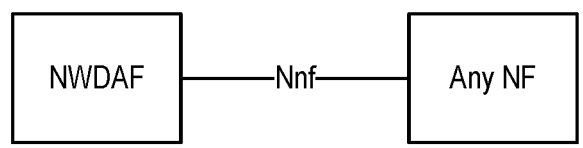
FIG. 4A illustrates the architecture for data collection.
Figure 4B:
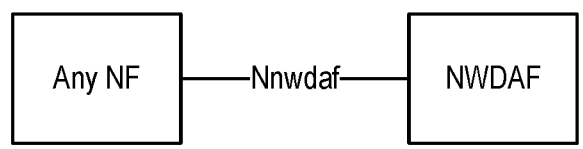
FIG. 4B illustrates the architecture for data analytics.

While not illustrated in the reference architectures of FIGS. 2 and 3, the conventional 5GC also includes a Network Data Analytics Function (NWDAF). FIGS. 4A and 4B illustrate the non-roaming architecture defined in 3GPP TS 23.288 V16.5.0 for the conventional NWDAF, which is hereinafter references as NWDAF 400. In particular, FIG. 4A illustrates the architecture for data collection. The Nnf interface is defined for the NWDAF 400 to request subscription to data delivery for a particular context, to cancel subscription to data delivery, and to request a specific report of data for a particular context.

FIG. 4B illustrates the architecture for data analytics. In general, any NF in the 5GC can request network analytics information from the NWDAF 400 via the Nnwdaf interface. The NWDAF 400 belongs to the same PLMN as the NF that consumes the analytics information. The Nnwdaf interface is defined for 5GC NFs to request subscription to network analytics delivery for a particular context, to cancel subscription to network analytics delivery, and to request a specific report of network analytics for a particular context.

As described in 3GPP TR 23.700-91, the functionality of the NWDAF 400 can be separated into a Data Management Framework for 5GC and Analytics functions. The Data Management Framework for 5GC uses the consumer and producer model of the services-based architecture to exchange data, or information of different types, as described in 3GPP TR 23.700-91.

Figure 5:
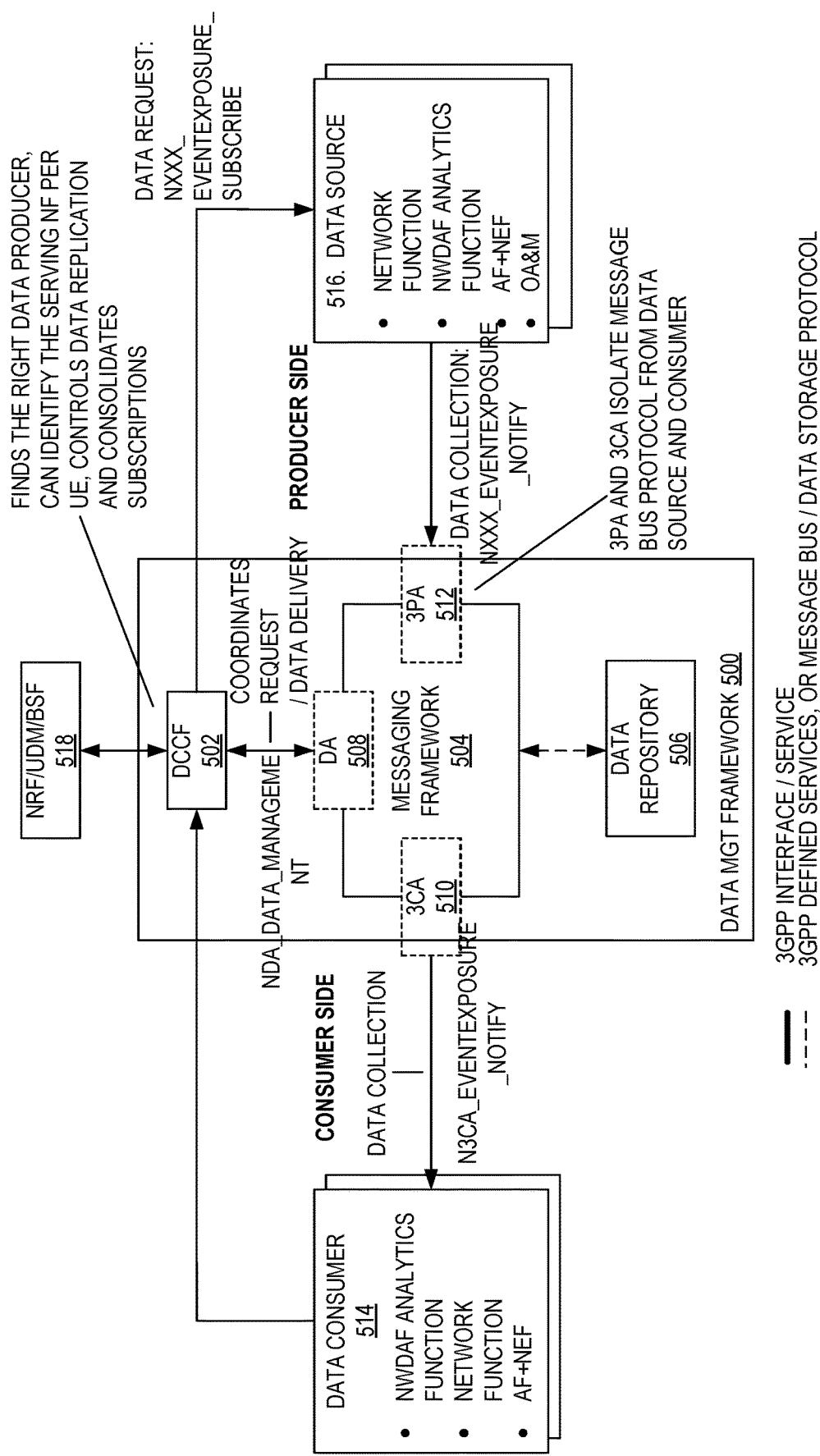
FIG. 5 illustrates a Data Management Framework for Fifth Generation Core (5GC).

FIG. 5 illustrates the Data Management Framework for 5GC, which is denoted herein as a "Data Management Framework 500." The Data Management Framework 500 is also referred to herein as a "data management system 500." As illustrated in FIG. 5, the Data Management Framework 500 includes a Data Collection Coordination Function (DCCF) 502, a Messaging Framework 504 (also referred to herein as a messaging system 504), and a Data Repository 506. The Data Management Framework 500 also includes a DCCF Adaptor (DA) 508, a Consumer Adaptor (3CA) 510, and a Producer Adaptor (3PA) 512. The Data Management Framework 502 operates as a producer with respect to one or more data consumers 514. Examples of the data consumer(s) 514 include a NWDAF Analytics function(s), a NF, an AF, and/or a NEF. The Data Management Framework 502 operates as a consumer with respect to one or more data sources 516, which may also be referred to herein as data producers 516. Examples of the data source(s) 516 include a NF, a NWDAF Analytics function(s), an AF(s), a NEF(s), and/or Operations and Management (OA&M). The DCCF 502 uses NRF, UDM, or Binding Support Function (BSF) (denoted herein as NRF/UDM/BSF 518) to, e.g., find the correct data producer 514.

It should be noted that the Data Management Framework 500 and more specifically the DCCF 502, the Messaging Framework 504, the Data Repository 506, the DA 508, the 3CA 510, and the 3PA 512 are implemented on a network node, implemented on separate network nodes, or implemented in a distributed manner across two or more network nodes. In other words, the DCCF 502, the messaging framework 504, the data repository 506, the DA 508, the 3CA 510, and the 3PA 512 are each implemented in hardware or a combination of hardware and software (e.g., software stored in memory of a network node and executed by processing circuitry of the network node to thereby cause the network mode to provide the respective functionality).

Systems and methods for enabling the DCCF 502 to manage encryption and integrity key for data collection are disclosed herein. For the same type of data collection, the DCCF 502 manages an encryption key and an integrity key. These keys may be separate key or the same key. The DCCF 502 provides the keys to the data consumer 514 and the data producer 516. The data producer 516 uses the keys to encrypt the data and generate a MIC, while the data consumer 514 uses the keys to decrypt the data and check the MIC. In such way, the data will not be revealed to the Messaging Framework 504 and any modification of the data can be detected.

Figure 6:
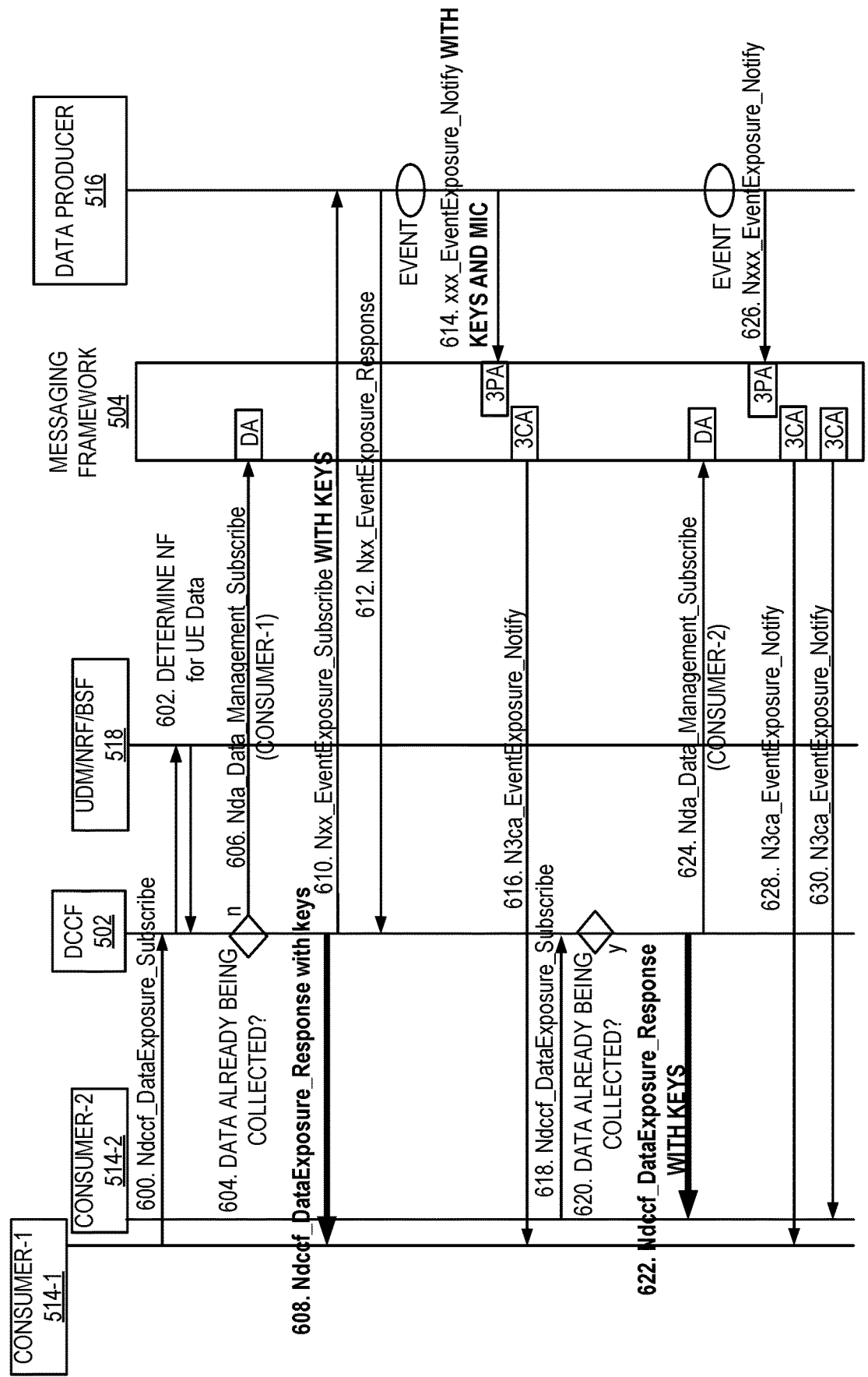
FIG. 6 illustrates the operation of the entities of FIG. 5 in accordance with some embodiments of the present disclosure.

FIG. 6 illustrates the operation of the entities of FIG. 5 in accordance with one example embodiment of the present disclosure. The steps of this procedure are as follows:

Step 600: Data Consumer-1 (e.g.: NWDAF-1), which is also denoted herein as Data Consumer 514-1, sends a request for data to the DCCF 502. The message includes a Notification Target Address, which is the address of Data Consumer-1 514-1 (see e.g., 3GPP TS 23.501). The message (i.e., the request) may indicate whether the requested data should be sent to the Notification Target Address set to Data Consumer-1 514-1 and/or to other Consumers such as, e.g., the Data Repository 506. A Notification Correlation ID of the Consumer-1 514-1 is included in the message and is used for notifications sent to Data Consumer-1 514-1 (e.g., in step 616). The Notification Correlation ID is used by the data consumer to correlate the notification message to the subscription. The data consumer may subscribe to different data, so it needs some ID to distinguish which notification message is for which data subscription. This is the Notification Correlation ID. In some embodiments, in this step 600, a data encryption key $K_D$ and a data integrity key $K_I$ are sent from Data Consumer-1 for the DCCF 502 to forward. These two keys may be separate keys or may be the same key.

Note that, this is optional. As discussed below, the DCCF 502 may alternatively generate these keys itself or obtain them from another network node. Also, if the keys are provided in step 600, the DCCF 502 may, in some embodiments, decide whether to override these keys with other keys (e.g., keys that it has generated itself or keys that it has obtained from another network node).

Step 602: If the request is for UE data (i.e., data for a particular UE), the DCCF 502 may query the UDM/NRF/BSF 518 to determine the NF serving the particular UE. In some embodiments, the DCCF 502 obtains a data encryption key $K_D$ and a data integrity key $K_I$ from the UDM/NRF/BSF 518 for the DCCF 502 to forward. Again, the DCCF 502 may alternatively generate these keys itself or obtain them from another network node (e.g., the Data Consumer-1 in step 600). Also, if the keys are obtained in step 602, the DCCF 502 may, in some embodiments, override keys received in step 600, if any, with the keys obtained from the UDM/NRF/BSF 518.

Step 604: The DCCF 502 determines the Data Source (or Data Producer) 516 (e.g., AMF-1) that can provide the requested data and checks that the requested data is not already being collected. If the requested data is not already being collected, then the DCCF 502 either generates a data encryption key $K_D$ and a data integrity key $K_I$ or decides to use keys that were otherwise obtained (e.g., from the Data Consumer-1 514-1 in step 600 or from the UDM/NRF/BSF 518 in step 602). Again, these two keys may be separate keys or may be the same key. The DCCF 502 keeps a mapping between the subscription (identified by a Subscription ID) and the pair of keys (the data encryption key $K_D$ and the data integrity key M.

Step 606: The DCCF 502 controls the message bus and the adaptors (e.g., the 3CA 510 and 3PA 512) so the notifications (i.e., the notifications comprising the requested data) traverse the messaging framework 504. As illustrated, this is done by sending an Nda_Data_Management_Subscribe message to the Messaging Framework 504 and, more specifically, to the DA 508. The subscription (i.e., the Nda_Data_Management_Subscribe message) sent to the DA 508 includes a Notification Correlation ID of the 3PA 512 and the Notification Correlation ID for Data Consumer-1 514-1 as received in step 600. The DA 508 may associate these with a messaging framework. The 3PA 512 is provided with its Notification Correlation ID and the "Data Tag." The Data Tag is used internally by the messaging framework 504 to correlate data to subscribers. The 3CA 510 is provided with the consumer's notification endpoint (i.e., the notification target address), the Notification_Correlation_ID of the Consumer-1 514-1, and the "Data Tag." The 3CA 510 may then subscribe to the "Data Tag" in the messaging framework.

Step 608: The DCCF 502 send a subscription response to the Data Consumer-1 514-1. In the response, the DCCF 502 provides the key $K_D$ and the key $K_I$ as well as a Subscription ID. The Subscription ID is used by the DCCF 502 and Data Consumer-1 514-1 (e.g., if the data consumer wants to terminate the subscription, then it sends a request with this ID to DCCF 502, then DCCF 502 knows which subscription should be terminated).

Step 610: The DCCF 510 sends a subscription request to a NF producer acting as the Data Producer (data source) 516. The subscription includes the notification endpoint and Notification Correlation ID of the 3PA 512 that is acting as the receiver for these notifications. The request also includes the key $K_D$ and the key $K_I$.

Step 612: The Data Producer 516 acknowledges the request with a Subscription ID. Note that this Subscription ID is used between the DCCF 502 and the Data Producer 516 and should be distinguished from the above-described Subscription ID that is used between the DCCF 502 and the Data Consumer (e.g., the Data Consumer-1 514-1).

Step 614: The Data Producer 516 sends a notification containing the Notification Correlation ID of the 3PA 512 to the 3PA after an event trigger at the Data Producer 516. The 3PA 512 publishes the data included in the notification in the message framework 504. It may use the "Data Tag" associated with the Notification Correlation ID of the 3PA 512 received in step 606. In one embodiment, the data is associated with a Data ID or a Sequence Number or a Random Nonce. The data is encrypted using $K_D$. In one embodiment, a MIC is also included in the message carrying the encrypted data. In one embodiment, the MIC is computed as HASH $_{KI}$(data||Data ID or Sequence Number or Random Nonce).

Step 616: When the data is published to the "Data Tag," the Messaging Framework 504 makes it available to all subscribed 3CA. In this case, the only subscriber is the 3CA 510 serving Consumer-1 514-1. This 3CA 510 maps the "Data Tag" to the Notification Correlation ID of the Data Consumer (i.e., Consumer-1 514-1) received in Step 606 (which was originally provided by Data Consumer-1 514-1) and sends the notification (i.e., message including the encrypted data and optionally the MIC) to the notification endpoint of Data Consumer-1 514-1. In one embodiment, the message also includes the Data ID or the Sequence number or the Random Nonce received in step 614.

When Data Consumer-1 514-1 receives the data, it will check the data integrity and decrypt the data.

Step 618: Data Consumer-2 (e.g.: NWDAF-2), which is also denoted herein as Data Consumer 514-2, sends a request for the same Data. The message may indicate whether the requested data should be sent to Data Consumer-2 514-2 and/or to other Consumers such as the Data Repository 506. The Notification Correlation ID of Data Consumer-2 514-2 is included for notifications sent to Data Consumer-2 514-2.

Step 620: The DCCF 502 determines that the requested data is already being collected from a Data Source (e.g.: AMF-1) and retrieves 3PA ID and the Notification Correlation ID of the 3PA 512.

Step 622: The DCCF 502 sends the subscription response to the Data Consumer-2 514-2. In the response, the DCCF 502 provides key $K_D$ and key $K_I$ as well as a Subscription ID. The keys are the same as step 608, since Data Consumer-2 514-2 requests the same data as Data Consumer-1 514-1.

Step 624: The DCCF 502 sends a subscription request to the Messaging Framework 504 indicating that there is a new subscriber of the data. The subscribe message to the DA 508 provides the 3PA ID, the 3PA Notification Correlation ID currently in use, and the Notification Correlation ID for Data Consumer-2 514-2 as received in step 618. The DA 508 selects the existing "Data Tag" corresponding to the 3PA information and sends the 3CA Consumer-2's notification endpoint, the Notification_Correlation_ID of Consumer-2, and the "Data Tag." The 3CA 510 may then subscribe to the "Data Tag" in the messaging framework.

NOTE: The 3CA 510 for Consumer-2 may be different or the same from 3CA 510 for Consumer-1.

Step 626: After an event is triggered in the data source 514, a Notification is sent to the 3PA 512, and the 3PA 512 publishes the data to the corresponding "Data Tag" on the Messaging Framework 504. The confidentiality and integrity protection is done as step 614.

Steps 628-630: When the data is published to the "Data Tag," the Messaging Framework 504 makes it available to the subscribed 3Cas 510. In this case, the 3CAs 510 serving consumer-1 and consumer-2 receive the data and send the notifications to the notification endpoints of Data Consumer-1 514-1 and Data Consumer-2 514-2 using the Notification Correlation ID of Consumer-1 and Consumer-2, respectively. When Data Consumer-1 514-1 and Data Consumer-2 514-2 receive the data, they will check the data integrity and decrypt the data.

In one embodiment, when the DCCF 502 provides the key $K_D$ and key $K_I$, it also maintains a timer for renewing the keys. When the DCCF 502 decides to renew the keys, it will send to the data consumer(s) a message with the new keys associated with the Subscription ID mentioned in step 608. When the DCCF 502 sends the new keys to the data consumer, it put the Subscription ID mentioned in step 612 in the message.

Figure 7:
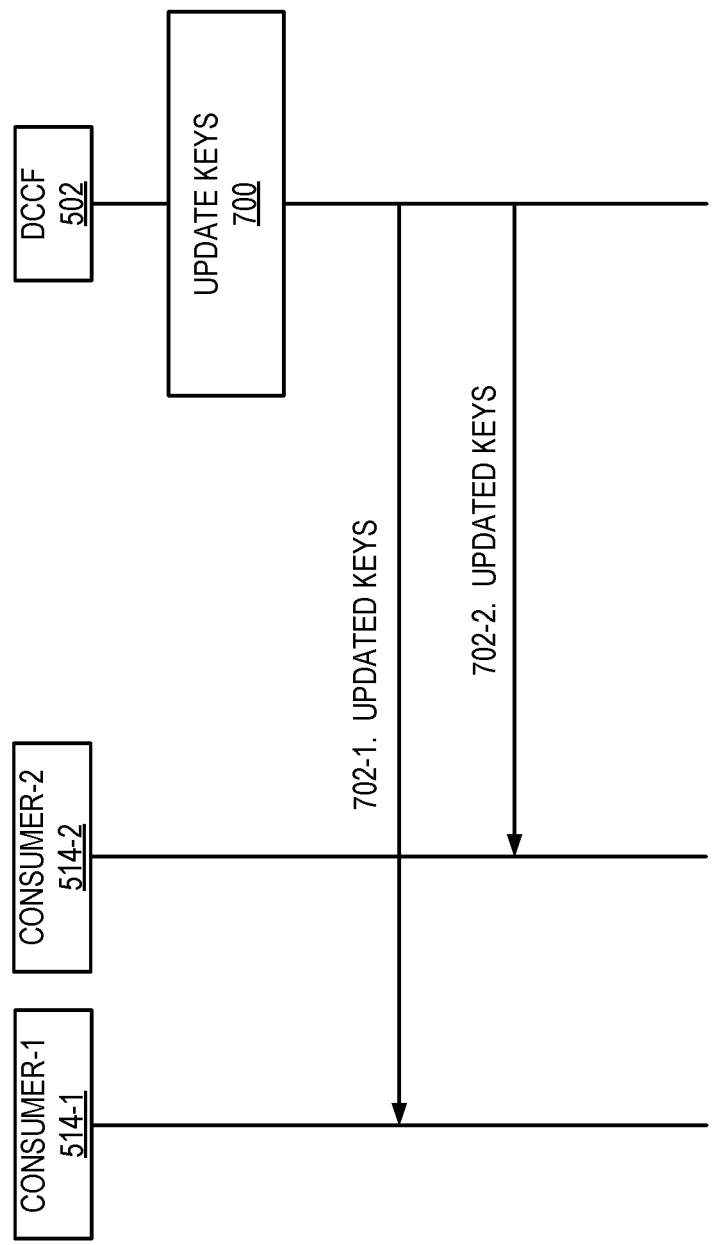
FIG. 7 illustrates a process by which Data Collection Coordination Function (DCCF) performs an update with respect to Data Consumers of FIG. 6.

In some embodiments, the DCCF 502 may subsequently update the keys and send the keys to the appropriate data consumers 514. In this regard, FIG. 7 illustrates a process by which the DCCF 502 performs such an update with respect to the Data Consumers 514-1 and 514-2 of FIG. 6. As illustrated, the DCCF 502 update the keys (step 700) and sends the update keys to the data consumers 514-1 and 514-2 (steps 702-1 and 702-2).

Figure 8:
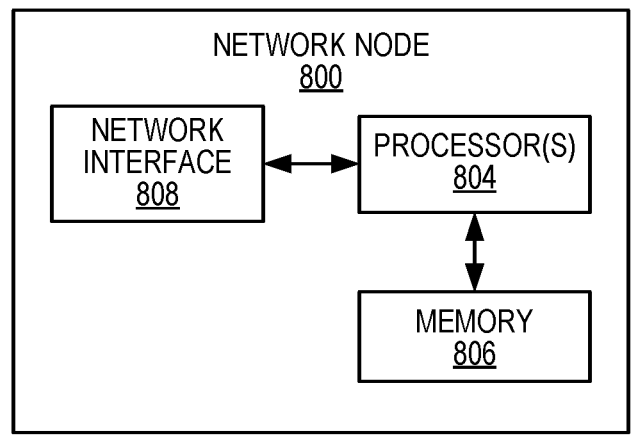
FIG. 8 illustrates a schematic block diagram of a network node in accordance with some embodiments of the present disclosure.

FIG. 8 is a schematic block diagram of a network node 800 according to some embodiments of the present disclosure. Optional features are represented by dashed boxes. The network node 800 is a network node that implements functionality described herein as being provided by the data management framework 500 or any component of the data management framework 500 (e.g., DCCF 502) or a network node that implements a data consumer (514) or a data producer (516). As illustrated, the network node 800 includes one or more processors 804 (e.g., Central Processing Units (CPUs), Application Specific Integrated Circuits (ASICs), Field Programmable Gate Arrays (FPGAs), and/or the like), memory 806, and a network interface 808. The one or more processors 804 are also referred to herein as processing circuitry. The one or more processors 804 operate to provide one or more functions of the network node 800 as described herein (e.g., one or more functions of the DCCF 502, the data consumer 514, or the data producer 516, the DA 508, the 3CA 510, or the 3PA 514, as described herein). In some embodiments, the function(s) are implemented in software that is stored, e.g., in the memory 806 and executed by the one or more processors 804.

Figure 9:
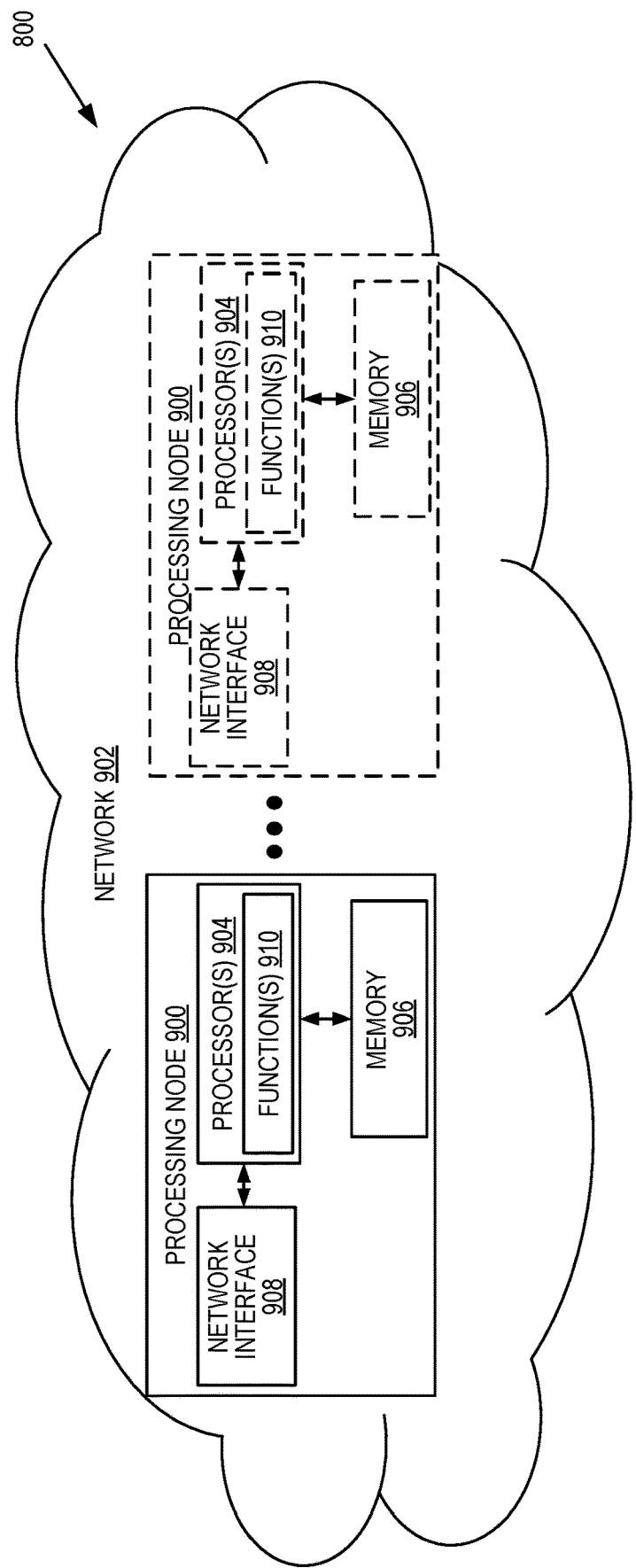
FIG. 9 illustrates a schematic block diagram of a virtualized embodiment of the network node in accordance with some embodiments of the present disclosure.
Figure 11:
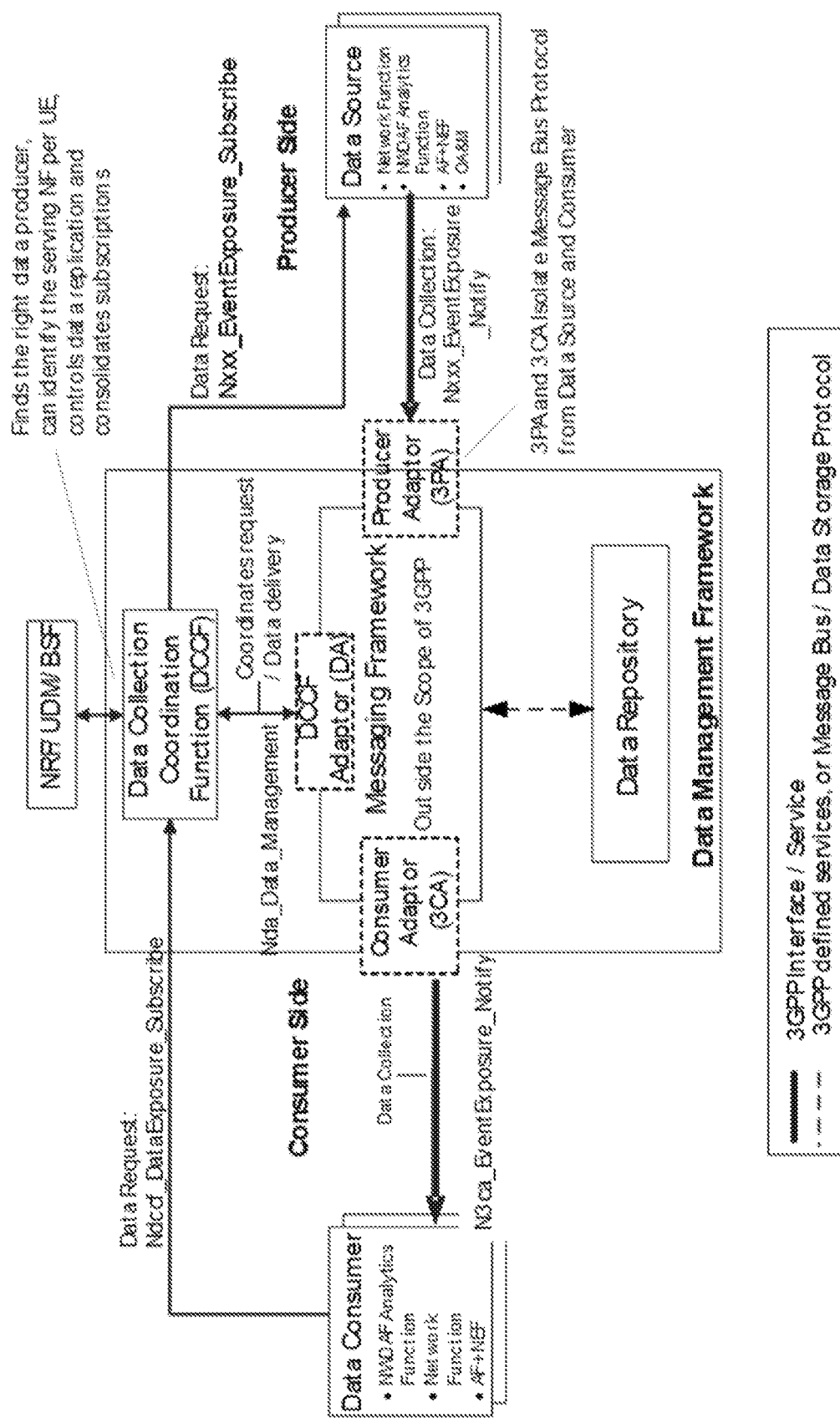
FIG. 11 is "FIG. 6.9.2.1-1: Data Management Framework for 5GC" in 3GPP TR 23.700-091.
Figure 12:
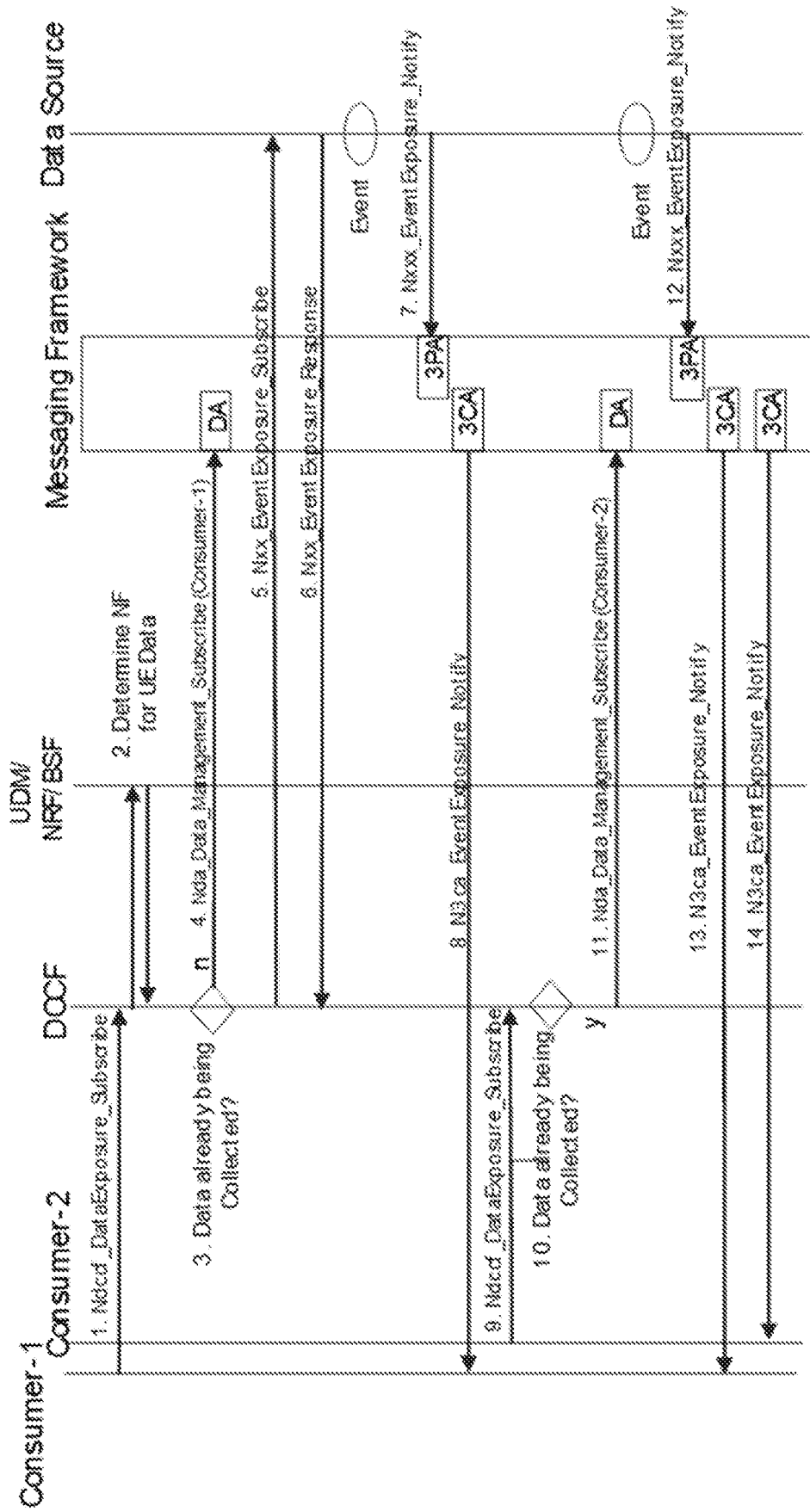
FIG. 12 is "FIG. 6.9.3-1: Data Collection & Distribution for Event Notifications (Subscribe/Notify)" in 3GPP TR 23.700-091.

FIG. 9 is a schematic block diagram that illustrates a virtualized embodiment of the network node 800 according to some embodiments of the present disclosure. Again, optional features are represented by dashed boxes. As used herein, a "virtualized" network node is an implementation of the network node 800 in which at least a portion of the functionality of the network node 800 is implemented as a virtual component(s) (e.g., via a virtual machine(s) executing on a physical processing node(s) in a network(s)). As illustrated, in this example, the network node 800 includes one or more processing nodes 900 coupled to or included as part of a network(s) 902. Each processing node 900 includes one or more processors 904 (e.g., CPUs, ASICs, FPGAs, and/or the like), memory 906, and a network interface 908. In this example, functions 910 of the network node 800 described herein (e.g., one or more functions of the DCCF 502, the data consumer 514, or the data producer 516, the DA 508, the 3CA 510, or the 3PA 514, as described herein) are implemented at the one or more processing nodes 900 or distributed across two or more of the processing nodes 900 in any desired manner. In some particular embodiments, some or all of the functions 910 of the network node 800 described herein (e.g., one or more functions of the DCCF 502, the data consumer 514, or the data producer 516, the DA 508, the 3CA 510, or the 3PA 514, as described herein) are implemented as virtual components executed by one or more virtual machines implemented in a virtual environment(s) hosted by the processing node(s) 900.

In some embodiments, a computer program including instructions which, when executed by at least one processor, causes the at least one processor to carry out the functionality of the network node 800 or a node (e.g., a processing node 900) implementing one or more of the functions 910 of the network node 800 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 10:
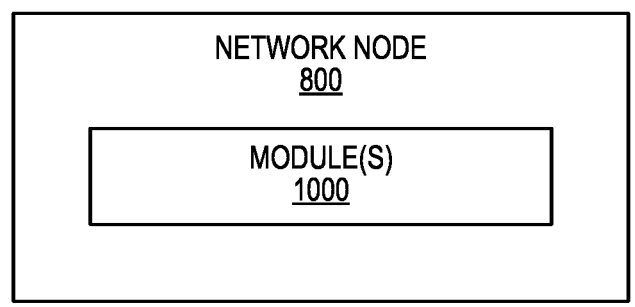
FIG. 10 illustrates a schematic block diagram of the network node in accordance with some other embodiments of the present disclosure.

FIG. 10 is a schematic block diagram of the network node 800 according to some other embodiments of the present disclosure. The network node 800 includes one or more modules 1000, each of which is implemented in software. The module(s) 1000 provide the functionality of the network node 800 described herein (e.g., one or more functions of the DCCF 502, the data consumer 514, or the data producer 516, the DA 508, the 3CA 510, or the 3PA 514, as described herein). This discussion is equally applicable to the processing node 900 of FIG. 9 where the modules 1000 may be implemented at one of the processing nodes 900 or distributed across multiple processing nodes 900.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

At least some of the following abbreviations may be used in this disclosure. If there is an inconsistency between abbreviations, preference should be given to how it is used above. If listed multiple times below, the first listing should be preferred over any subsequent listing(s).

3CA Consumer Adaptor
3GPP Third Generation Partnership Project
3PA Producer Adaptor
5G Fifth Generation
5GC Fifth Generation Core
5GS Fifth Generation System
AF Application Function
AMF Access and Mobility Function
AN Access Network
AP Access Point
ASIC Application Specific Integrated Circuit
AUSF Authentication Server Function
BSF Binding Support Function
CP Control Plane
CPU Central Processing Unit
DA DCCF Adaptor
DCCF Data Collection Coordination Function
DN Data Network
DSP Digital Signal Processor
eNB Enhanced or Evolved Node B
EPS Evolved Packet System
E-UTRA Evolved Universal Terrestrial Radio Access
FPGA Field Programmable Gate Array
gNB New Radio Base Station
gNB-CU New Radio Base Station Central Unit
gNB-DU New Radio Base Station Distributed Unit
HSS Home Subscriber Server
IoT Internet of Things
IP Internet Protocol
LTE Long Term Evolution
MIC Message Integrity Code
MME Mobility Management Entity
MTC Machine Type Communication
NEF Network Exposure Function
NF Network Function
NG-RAN Next Generation Radio Access Network
NR New Radio
NRF Network Function Repository Function
NSSF Network Slice Selection Function
NWDAF Network Data Analytics Function
OA&M Operations and Management
OTT Over-the-Top
PC Personal Computer
PCF Policy Control Function
P-GW Packet Data Network Gateway
QoS Quality of Service
RAM Random Access Memory
RAN Radio Access Network
ROM Read Only Memory
RRH Remote Radio Head
RTT Round Trip Time
SCEF Service Capability Exposure Function
SMF Session Management Function
UDM Unified Data Management
UE User Equipment
UP User Plane
UPF User Plane Function Those skilled in the art will recognize improvements and modifications to the embodiments of the present disclosure. All such improvements and modifications are considered within the scope of the concepts disclosed herein.

What is claimed is:

1. A method performed by a Data Collection Coordination Function, DCCF, in a data management framework for a core network of a cellular communications system, the method comprising:
   receiving, from a first data consumer in the core network, a subscription request message that requests a subscription to particular data;
   determining a data producer for the particular data in the core network;
   obtaining one or more keys for data encryption and/or data integrity for the particular data;
   controlling one or more entities in a messaging framework of the data management framework such that notifications of the particular data received from the data producer traverse the messaging framework to a target indicated in the subscription request message;
   sending a subscription response message to the first data consumer, the subscription response message comprising the one or more keys; and
   sending the subscription request message to the data producer, the subscription request message comprising the one or more keys to be used by the data producer when sending notifications of the particular data to the first data consumer via the messaging framework.

2. The method of claim 1 wherein the one or more keys comprise a data encryption key or a data integrity key.

3. The method of claim 1 wherein the one or more keys comprise a single key for both data encryption and integrity.

4. The method of claim 1 wherein the subscription request message received from the first data consumer comprises information that indicates the target for the notifications of the particular data.

5. The method of claim 1 wherein the subscription request message received from the first data consumer comprises a notification correlation ID of the first data consumer.

6. The method of claim 1 wherein the particular data is UE data, and the method further comprises querying another network node to determine the data producer that is serving an associated User Equipment, UE.

7. The method of claim 1 wherein controlling the one or more entities in the messaging framework of the data management framework such that notifications of the particular data received from the data producer traverse the messaging framework to the target indicated in the subscription request message received from the first data consumer comprises:
   sending a subscribe message to the messaging framework, the subscribe message comprising a notification correlation ID of a 3PA, a notification correlation ID for the first data consumer received in the subscription request message received from the first data consumer.

8. The method of claim 1 wherein the subscription request message sent to the data producer comprises information that indicates a 3PA of the messaging framework that is acting as a receiver for notifications of the particular data for the first data consumer.

9. The method of claim 1 further comprising:
receiving a second subscription request message from a second data consumer for the particular data;
determining that the particular data is already being collected from the data producer; and
responsive to determining that the particular data is already being collected from the data producer, sending a second subscription response message to the second data consumer, the second subscription response message comprising the one or more keys.

10. The method of claim 1 wherein obtaining one or more keys for data encryption and/or data integrity for the particular data comprises receiving the one or more keys in the subscription request from the first data consumer.

11. The method of claim 1 wherein obtaining one or more keys for data encryption and/or data integrity for the particular data comprises obtaining the one or more keys from another network function or generating the one or more keys.

12. The method of claim 1 wherein the first data consumer is:
a Network Data Analytics Function, NWDAF;
a network function;
an Application Function, AF; or
a Network Exposure Function, NEF, and
the data producer is:
a NWDAF;
a network function;
an AF;
a NEF; or
an Operations and Management entity.

* * * * *